April 14, 1953 T. J. TUREK ET AL 2,634,783
TIRE INFLATION CONTROL SYSTEM
Filed Oct. 30, 1950 5 Sheets-Sheet 4

INVENTORS
Thomas J. Turek
BY R. Van Dyke Firth Sr.
Scrivener + Parker
ATTORNEYS

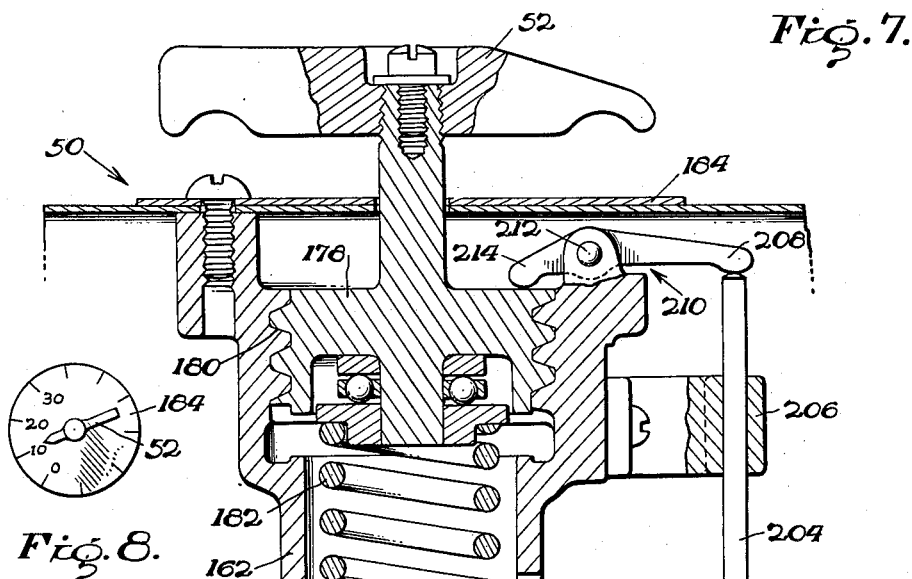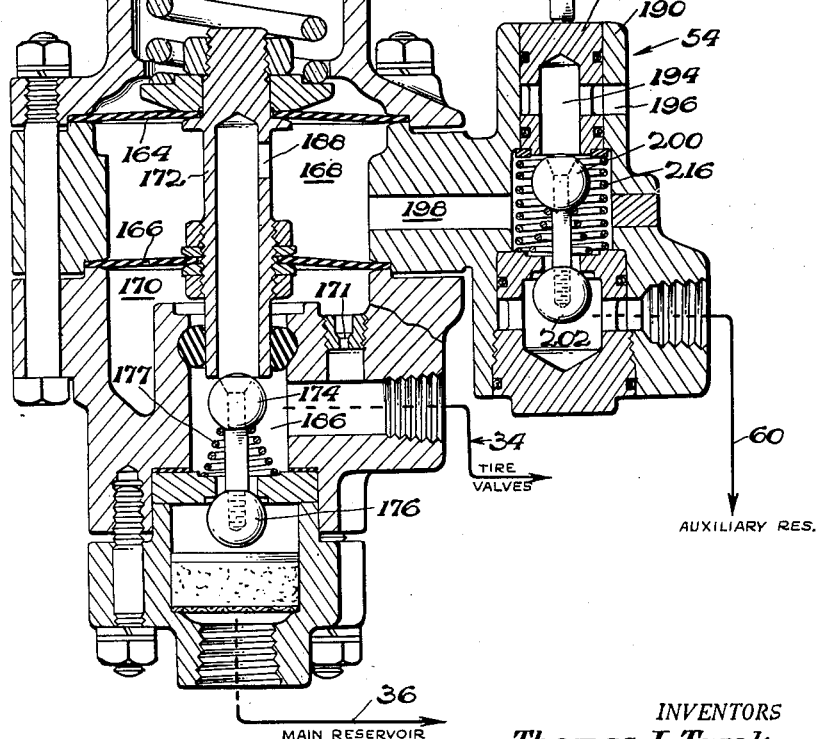

Patented Apr. 14, 1953

2,634,783

UNITED STATES PATENT OFFICE 2,634,783

TIRE INFLATION CONTROL SYSTEM

Thomas J. Turek, Berkeley, Calif., and Rowland Van Dyke Firth, Sr., Elyria, Ohio, assignors to Bendix-Westinghouse Automotive Air Brake Company, Elyria, Ohio, a corporation of Delaware Application October 30, 1950, Serial No. 192,890

17 Claims. (Cl. 152—417)

This invention relates to vehicle tire inflation systems, and more particularly to a system wherein the inflation pressures of the tires may be readily controlled by the operator during operation of the vehicle.

The principal object of the present invention is to provide a simplified central tire inflation control system for vehicles whereby, while the vehicle is in motion, the operator may automatically vary the tire pressures by merely adjusting a master control valve which is conveniently located adjacent the other vehicle controlling elements.

Another object is to provide a novel tire inflation system which incorporates a single conduit between the compressed air source carried by the vehicle, and the pneumatic tires, the arrangement being such that the tires may be inflated to any desired pressure in order to adapt the vehicle for efficient operation under variable conditions of loading as well as variable conditions of road surface.

Still another object is to provide in a system of the foregoing type, a novel construction which permits a reduction of the tire pressures to any desired value, the control being effected by a novel valve construction carried by the vehicle wheels and being operable in accordance with the degree of pressure of the air delivered to the single conduit.

A further object resides in providing a novel arrangement of parts which are so arranged as to be highly effective in the remote control of the vehicle tire pressures and which are constructed in such a manner as to be capable of operation throughout long periods of use without requiring adjustment or repair.

Other objects and novel features of the invention will appear more fully hereinafter from the following detailed description of the invention when taken in connection with the accompanying drawings. It is to be expressly understood however, that the drawings are utilized for purposes of illustration only, and are not designed as a definition of the limits of the invention, reference being had for this purpose to the appended claims.

In the drawings, wherein similar reference characters refer to similar parts throughout the several views;

Fig. 7 is a sectional view of the manually operable control valve device which controls the inflation and deflation of the tires, and Fig. 8 is a plane view of the face of the master control valve.

Figure 1:
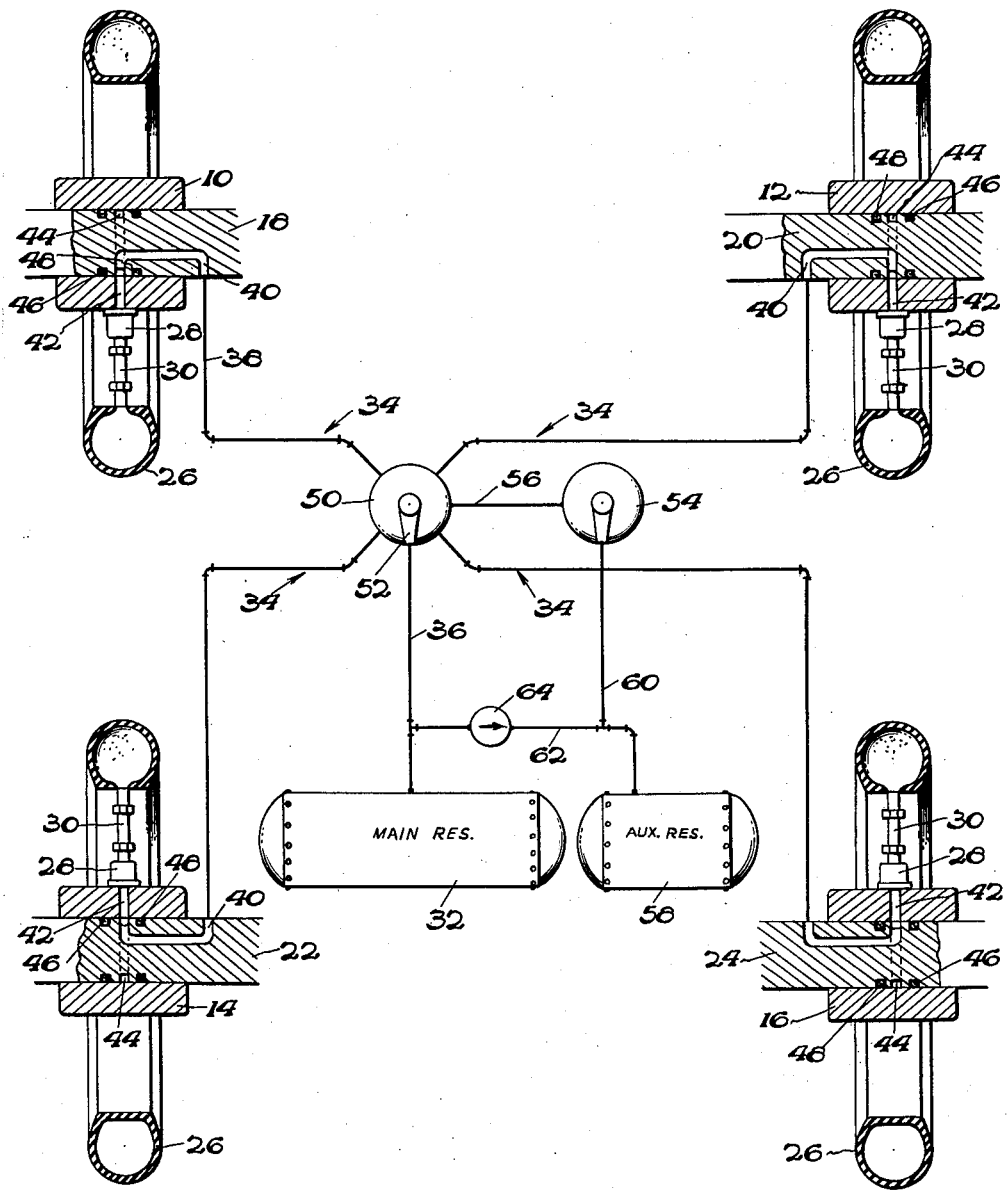
Fig. 1 is a diagrammatic view of a vehicle tire inflation system embodying the principles of the present invention, certain of the parts being shown in section.

Referring more particularly to Fig. 1, the present invention is illustrated therein as including a plurality of vehicle wheels 10, 12, 14 and 16 which are respectively rotatably mounted upon vehicle supporting members 18, 20, 22 and 24. A pneumatic tire 26 is carried by each of the wheels 10, 12, 14 and 16 and is provided with a control valve 28 for regulating the inflation pressure of the tire during operation of the vehicle, in a manner which will appear more fully hereinafter. As shown, the control valve 28 is connected with the tire 26 by a single outlet conduit 30, and fluid pressure is supplied to the valve 28 from a main reservoir 32 as by means of a single conduit 34 comprising interconnected sections 36, 38, 40 and 42. Since the vehicle wheels and the parts supporting them are relatively rotatable, it will be readily understood that the connection between the conduit sections 40 and 42 constitutes a running joint or gland. More particularly, the conduit section 40 terminates in an annular chamber 44 which is in constant communication with the conduit section 42. In order to prevent leakage of air from the chamber 44, a pair of rotary seals 46 and 48 are provided, these seals being illustrated as being housed within the stationary supports 18, 20, 22 or 24.

In order to control the degree of pressure of the compressed air conducted from the reservoir 32 through the conduits 34 to the various tires, the invention includes a manually operable feed valve 50 which is provided with a control member 52 movable to various positions in order to graduate the air pressure conducted to the conduits 34. The specific construction of the feed valve 50 is shown in Fig. 7 and will be referred to in detail hereinafter. For the present, it is desired to point out that the feed valve is so constructed and arranged that any desired inflation pressure may be passed therethrough and into the tires 26 of the vehicle wheels by way of the single conduits 34 associated with each of the wheels.

In addition to the above, the present invention provides an arrangement for reducing the inflation pressures of the vehicle tires. Such a reduction in tire pressures may be advisable during certain conditions of operation of the vehicle, depending for example, upon the load carried by the vehicle or upon condition of the roadway. As shown, the construction for enabling deflation of the tires includes a deflation control valve 54 which is connected with the feed valve 50 by conduit 56, and is also connected with an auxiliary reservoir 58 as by means of a conduit 60. Reservoirs 32 and 58 are interconnected by conduit 62 and this conduit includes a one way check valve 64 which permits flow of compressed air only from the main reservoir 32 to the auxiliary reservoir 58. In this manner, maximum pressure is always present in the auxiliary reservoir 58 notwithstanding that the compressed air in reservoir 32 may be employed for vehicle braking or for other purposes. As stated, the deflation valve 54 is connected with the feed valve 50 through the conduit 56, and as will appear more fully hereinafter, the association between these valves is such that operation of the control member 52 in one direction may serve to vary the pressures in the conduits 34, while movement of the member 52 in another direction will serve to operate the deflation valve 54 and to charge the conduits 34 with air pressure from the auxiliary reservoir 58.

It will be observed from Fig. 1 that all of the conduits 34 leading to the tires of the vehicle wheels are connected with the feed valve 50 so that operation of the latter serves to charge all of the conduits 34 with compressed air at the same pressure. In certain cases, it may be desirable to individually control the pressures of the tires, and Fig. 2 shows an arrangement whereby such individual control may be obtained.

Figure 2:
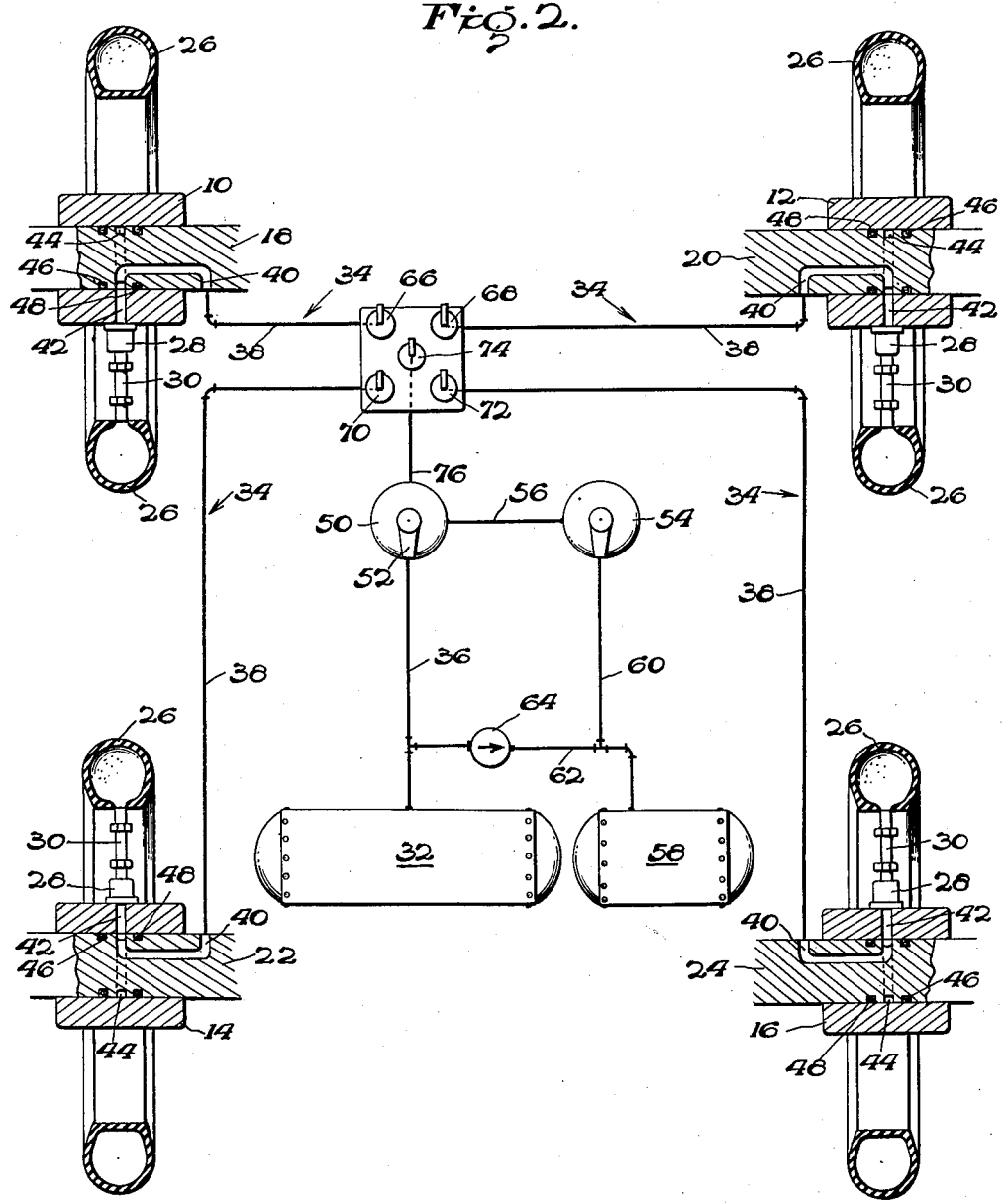
Fig. 2 is a diagrammatic view similar to Fig. 1 but illustrating a slightly modified form of the control system.

Referring more particularly to Fig. 2, the construction thereof is similar in all respects to the system of Fig. 1 with the exception that the conduits 34 are connected with the feed valve 50 through individual control valves 66, 68, 70 and 72, a master shut-off valve 74 being preferably employed in order to connect all the individual control valves with the feed valve 50 by way of a conduit 76. In this manner, when the shut-off valve 74 is opened, fluid pressure will be supplied to all the individual valves 66, 68, 70 and 72. Thereupon, the feed valve 50 may be moved to supply a predetermined pressure to the conduit 76 and this predetermined pressure may be conducted to any of the conduits 34 by merely opening the particular associated individual valve. It will be understood that the individual valves are thereafter closed and the feed valve 50 readjusted to supply any other desired pressure to the other conduits 34 by opening the individual valves associated with such conduits. After the tires have been charged to the desired pressures, the individual valves 66, 68, 70 and 72 are all moved to open position and the conduit 76 is exhausted by movement of the feed valve 50 to neutral or exhaust position.

It is to be pointed out that when the feed valve 50 in the system of Figs. 1 and 2 is moved to its normal position, all of the conduits 34 leading to the tires of the vehicle wheels are exhausted. As will appear more fully hereinafter, the control valve 28 carried by the vehicle wheels includes an inflation check valve which acts to retain the air pressure within the tire. Thus, when the conduits 34 are exhausted, after the tires have been inflated to the desired pressures, the air pressure acting upon the rotary seals 46 and 48 will be relieved, thus materially prolonging the life of such seals.

Figure 3:
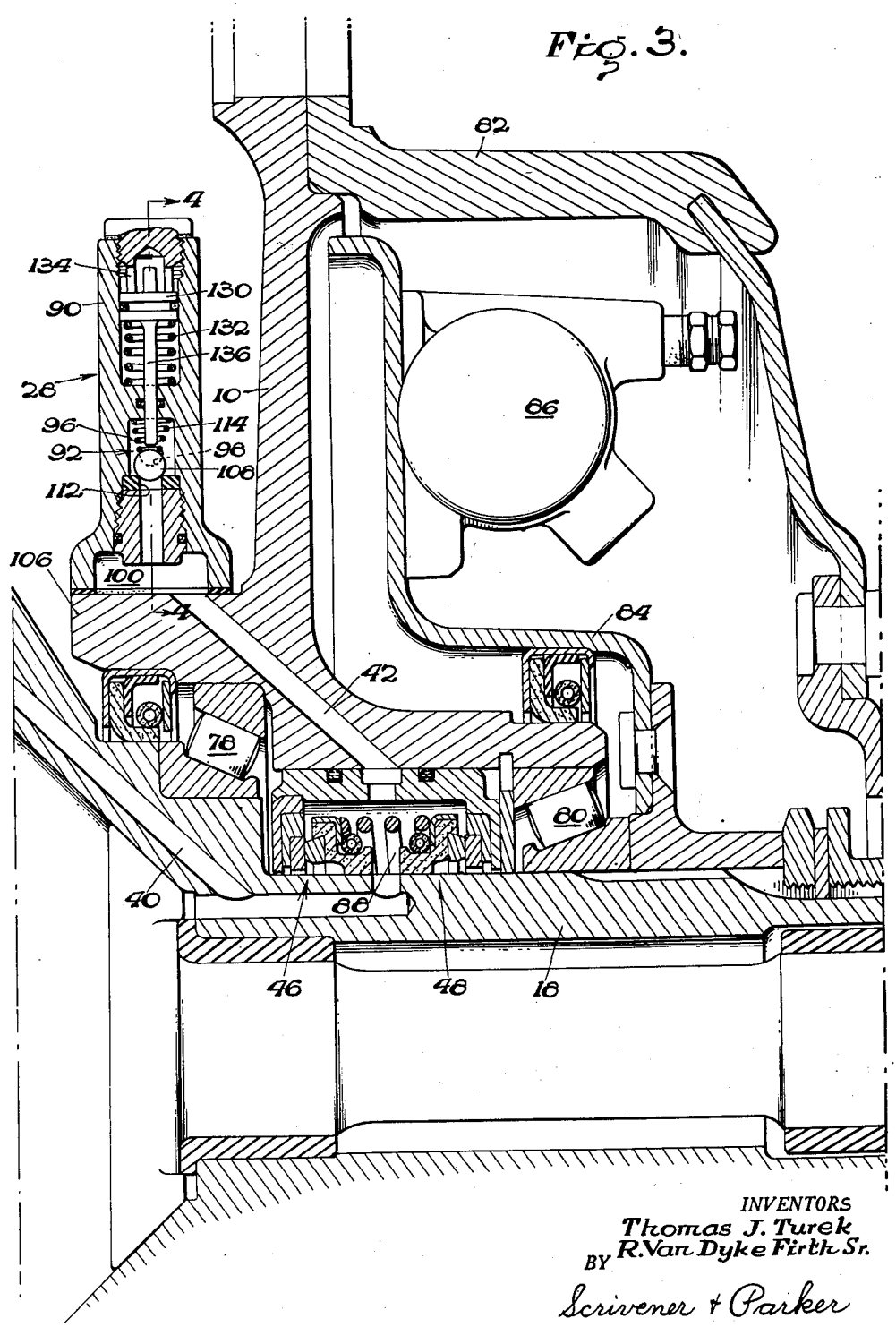
Fig. 3 is a partial sectional view of one of the vehicle wheels and illustrates one form of control valve mechanism associated with the wheel.
Figure 4:
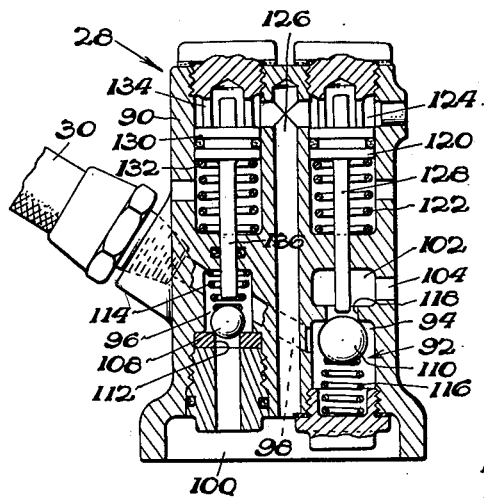
Fig. 4 is a sectional view of the control valve mechanism of Fig. 3 and taken substantially along line 4—4 of Fig. 3.

Referring more particularly to Figs. 3 and 4, the wheel 10 is shown as being mounted upon the stationary part 18 as by means of suitable bearings 78 and 80, the wheel being provided with the usual brake drum 82 and the stationary part 18 having the usual backing plate 84 adapted to support a brake cylinder 86. Also as shown, the rotary seals 46 and 48 are separated as by means of a spring 88. However, it will be understood that the invention is not limited to the particular wheel construction nor to the particular rotary seal construction, it being understood that the seals are only provided for preventing undue leakage of air between the wheel 10 and the support 18 when the tires are being inflated or deflated.

The control valve 28 constitutes a novel arrangement whereby the flow of compressed air is readily permitted from the conduit 34 to the tire 26 while preventing return flow from the tire. In addition to this function, the control valve 28 also permits the pressure in the tire 26 to be reduced when it is desired to lower the tire pressure. To this end, the control valve 28 comprises a casing 90 provided with an outlet chamber 92 which includes portions 94 and 96 which communicate with each other through a passage 98 and which also communicate with the vehicle tire through the conduit section 30. The casing 90 is also provided with an inlet chamber 100 which communicates at all times with the conduit section 42, and is also provided with an exhaust chamber 102 which is in constant communication with the atmosphere through a port 104. The control valve 28, as shown in Fig. 3, is supported by a part 106 of the wheel 10 so that the valve 28 and all parts connected thereto, rotate with the vehicle wheel.

In order to maintain the air pressure in the tire 26 and to provide a novel arrangement for lowering this pressure at the will of the operator, the control valve 28 includes an inflation check valve 108 and a deflation check valve 110. As shown, Figs. 3 and 4, the inflation check valve is normally urged to contact its seat 112 as by means of a spring 114. In like manner, the deflation check valve 110 is normally urged by a spring 116 to engage a seat 118. Thus, when the parts occupy the positions shown in Fig. 4, the deflation check valve 110 is closed and prevents communications between the outlet chamber 92 and the exhaust chamber 102. The inflation check valve 108 on the other hand, is so arranged as to allow air pressure to flow from the inlet chamber 100 to the tire by way of the outlet chamber 92 and the conduit 30 when it is desired to inflate the tire, it being obvious however that when the feed valve 50 is returned to exhaust position to exhaust the inlet chamber 100, the check valve 108 closes and prevents return flow of air from the tire. Thus it will be seen that during inflation of the tire to the desired pressure, the control valve 28 functions to allow charging of the tire and to thereafter prevent any loss of air pressure from the tire when the feed valve 50 is returned to exhaust position.

In order to lower the tire pressure when this appears to be desirable, the present invention provides a novel construction for opening the deflation check valve 110 in order to connect the tire to the atmospheric port 104 by way of the conduit 30, outlet chamber 92 and exhaust chamber 102. Preferably, such construction includes a pressure responsive means which is movable in response to the admission of a predetermined pressure to the inlet chamber 100, to open the deflation check valve 110. More particularly, and as shown in Fig. 4, such means includes a pressure responsive piston 120 which is normally urged as by a spring 122 to a position where the upper portion of the piston 120 engages a stop 124. Compressed air from the inlet chamber 100 is conducted to the space above the piston 120 through a passage 126 and the spring 122 is adjusted so as to permit downward movement of the piston 120, as viewed in Fig. 4, only when the air pressure above the piston reaches a value which exceeds the maximum air pressure to which the tire is inflated in practice. When such a predetermined pressure is present in the inlet chamber 100, the passage 126 and the space above the piston 120, the piston 120 will be moved downwardly to bring a plunger 128 carried thereby into engagement with the deflation check valve 110 to positively move the latter off its seat 118 and to connect the tire 26 with the atmospheric port 104 through conduit 30, outlet chamber 92 and exhaust chamber 102. Under these conditions, the pressure within the tire is rapidly reduced and may be lowered to any desired value depending upon how long the deflation check valve remains open. It will be understood that when a lowering of the tire pressure is desired, the pressure admitted to the inlet chamber 100 is obtained from the auxiliary reservoir 58 by first operating the deflation control valve 54 and by then moving the member 52 of the feed valve 50 in the position previously indicated so that the conduit 34 is charged with auxiliary reservoir pressure.

During lowering of the tire pressure, and as above brought out, the air pressure present in the inlet chamber 100 is at a relatively high value. Moreover, when the deflation check valve 110 is open, the tire 26 is connected with the atmospheric port 104 as previously set forth. Under these conditions, it is desirable to prevent opening of the inflation check valve 108 which would otherwise connect the inlet chamber 100 with the tire 26 and deplete the auxiliary reservoir through the open deflation check valve 110.

In order therefore to prevent the occurrence of the above condition, the invention provides a novel arrangement for positively holding the inflation check valve 108 in closed position whenever the deflation check valve 110 is open. To this end, the control valve 28 includes a pressure responsive means in the form of a piston 130 which is normally urged by a spring 132 to a position where the upper portion of the piston engages a stop 134. The spring 132, like the spring 122, is so adjusted as to allow downward movement of the piston 130 only when the pressure within the inlet chamber 100, the passage 126, and in the space above the piston 130, reaches a value in excess of the normal operating pressure of the tire. Thus, the piston 130 will be moved downwardly, concurrently with downward movement of the piston 120, and while the latter piston opens the deflation check valve 110, the piston 130 will, through a plunger 136, engage the inflation check valve 108 and firmly maintain the same on its seat 112. Thus, during deflation of the tire, no air pressure will flow from the inlet chamber 100 to the outlet chamber 92 by reason of the positive closure of the inflation check valve 108.

Figure 5:
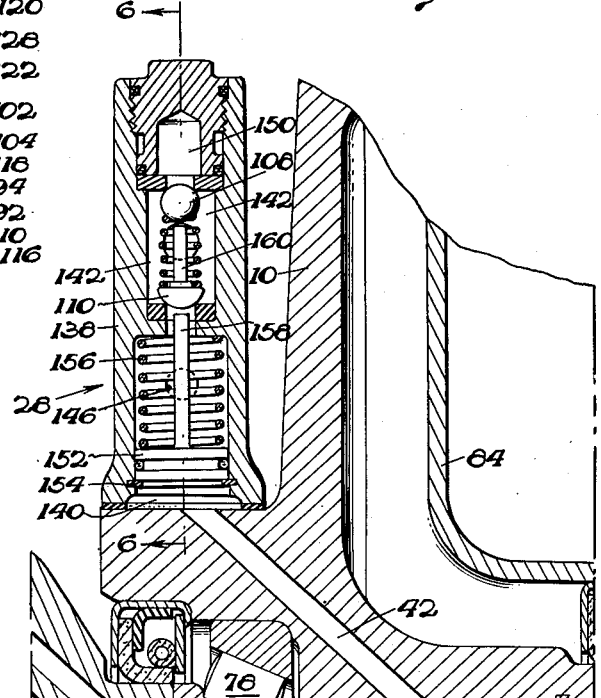
Fig. 5 is a partial sectional view of a vehicle wheel having a modified form of control valve associated therewith.
Figure 6:
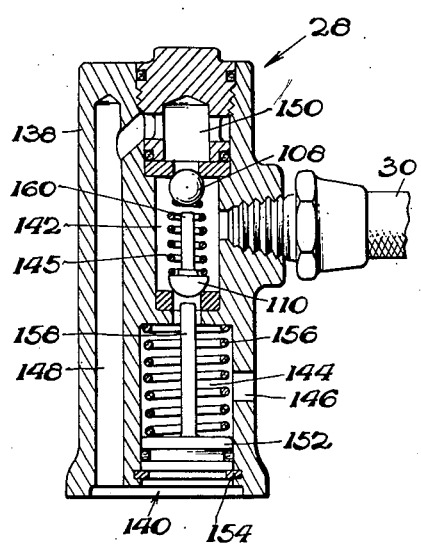
Fig. 6 is a sectional view of the control valve of Fig. 5 and taken substantially along line 6—6 thereof.

A slightly modified form of control valve is disclosed in Figs. 5 and 6, this embodiment of the invention including a single pressure responsive means for opening the deflation check valve 110 and positively closing the inflation check valve 108. More particularly, and as shown in Figs. 5 and 6, the modified form of control valve 28 includes a casing 138 provided with an inlet chamber 140, an outlet chamber 142 and an exhaust chamber 144, the latter communicating with the atmosphere through an atmospheric port 146. As shown more particularly in Fig. 6, the inflation check valve 108 and the deflation check valve 110 are normally closed as by means of a spring 145 interposed therebetween. When inflating, graduated pressure admitted to the inlet chamber 140 is conducted to the tire 26 by way of passage 148, chamber 150, valve 108, outlet chamber 142 and conduit 30. As soon as the inlet chamber 140 has been exhausted, due to movement of the feed valve 50 to the exhaust position, the inflation check valve 108 serves to prevent any return flow of air pressure from the tire.

When it is desired to reduce the pressure in the tire, the deflating valve 54 and the feed valve 50 are manipulated in the same manner as heretofore described in connection with Figs. 3 and 4, and auxiliary reservoir pressure is admitted to the inlet chamber 140 to act upon a piston 152 which is normally maintained in the position to engage a stop 154 as by means of a spring 156. This latter spring is adjusted in the same manner as the springs 122 and 132 of Fig. 4 and as soon as the pressure within the inlet chamber 140 reaches a value which exceeds the maximum normal operating pressure of the tire, the piston 152 is moved upwardly in order to bring the upper end of a plunger 158 into engagement with the deflation check valve 110 and to open the same. When this occurs, a plunger 160, carried by the deflation check valve 110, engages the inflation check valve 108 in order to positively maintain the latter in a closed condition and prevent any communication between the chambers 150 and 142. With the parts in this position, the pressure in the tire is reduced since the tire is connected to the atmospheric port 146 by way of conduit 30, outlet chamber 142 and exhaust chamber 144. As soon as the tire pressure has been reduced to the desired value, the valve 54 is closed and the feed valve 50 is moved to exhaust position in order to exhaust the conduit 34, conduit sections 40 and 42 and the inlet chamber 140. Thereupon, the spring 156 moves the piston 152 downwardly to engage the stop 154 and the parts are returned to the position illustrated in Figs. 5 and 6.

In order to effect the control of fluid pressures through the single conduits 34 leading to the various vehicle tires, the feed valve 50 and the deflation control valve 54 are constructed and associated in a novel manner. Referring more particularly to Fig. 7, the feed valve 50 includes a casing 162 having a pair of spaced diaphragms 164 and 166 therein defining an exhaust chamber 168 and a control chamber 170. Diaphragms 164 and 166 are interconnected by a hollow plunger 172 which is adapted upon downward movement thereof to engage an exhaust valve 174 and to open an intake valve 176 connected thereto. Movement of the plunger 172 and the diaphragms 164 and 166 is effected by means of the control handle 52 which is secured to a rotatable cam 178 which is threadedly mounted at 180 in the casing 162. A graduating spring 182 is interposed between the cam 178 and the upper diaphragm 164 so that as the cam 178 is rotated in such a direction as to be moved downwardly, as viewed in Fig. 7, the spring 182 will be compressed in order to move the plunger 172 and the diaphragms 164 and 166 downwardly as above set forth. Preferably, a dial or scale 184, suitably calibrated in pounds per square inch, is associated with the control handle 52 and the arrangement is such that as the handle 52 is moved in a clockwise direction, see Fig. 8, the cam 178 moves downwardly to compress the spring 182, to close the exhaust valve 174 and to open the inlet valve 176. As the handle 52 is moved to the zero position, indicated on the dial 184, the parts are moved to the position shown where the exhaust valve 174 is open and the conduits 34 connecting the tires with an inlet chamber 186 communicate through the hollow plunger 172 with the exhaust chamber 168 by way of an opening 188.

For the purpose of associating the deflation control valve 54 with the feed valve 50, the former is provided with a casing 190 in which an actuating member 192 is slidably mounted. This actuating member is provided with a passage 194 which normally communicates with an atmospheric port 196 so that in the position shown, the exhaust chamber 168 is connected with the atmospheric port 196 by way of a passage 198 and passage 194. Downward movement of the member 192, as viewed in Fig. 7, serves to contact an exhaust valve 200 and open an intake valve 202 in order to successively cut off communication between the passages 194 and 196 and to connect the latter passage with the conduit 60 connected with the auxiliary reservoir. As soon as this occurs, auxiliary reservoir pressure is admitted to the exhaust chamber 168 and effects an upward movement of the plunger 172 and the diaphragms 164 and 166. This upward movement is insured because the area of the diaphragm 164 is slightly larger than the area of the diaphragm 166. Such upward movement insures that the lower end of the plunger 172 will be spaced from the exhaust valve 174 in order to permit the auxiliary reservoir pressure to be conducted through the hollow plunger 172, to the chamber 186 and thence to the control valves 28 through the conduits 34.

A novel arrangement is provided for actuating the member 192 from the control handle 52. As shown, such arrangement includes a plunger 204 slidably mounted in a bracket 206 and having its upper end in engagement with an arm 208 of a lever 210. The lever 210 is pivotally mounted at 212 to the casing 162 and has its opposite arm 214 in engagement with the upper face of the cam 178. With such an arrangement, it will be readily understood that as the handle 52 is moved in a counter-clockwise direction from the zero mark on the scale 184, the cam 178 will be moved upwardly in order to move the plunger 204 downwardly through rocking of the lever 210 in a clockwise direction about its pivotal mounting 212. In this manner the member 192 of the deflation control valve 54 is moved downwardly in order to close the exhaust valve 200, open the intake valve 202, and connect the auxiliary reservoir 58 to the conduits 34 by way of conduit 60, passage 198, exhaust chamber 168, opening 188, hollow plunger 172 and outlet chamber 186.

From the above, it will thus be readily seen that movement of the control handle 52 in a clockwise direction, as viewed in Fig. 8, serves to graduate the pressure of the air admitted from the main reservoir 32 to the control conduits 34, the degree of pressure conducted to the control valves 28 and thence to the tires being readily determined by the position of the control handle 52 with respect to the dial 184. In this connection, it is to be pointed out that the feed valve 50 is of the pressure graduating or self-lapping type wherein the pressure admitted to the outlet chamber 186 is dependent upon the degree of compression of the graduating spring 182. For example, as the spring 182 is compressed to a predetermined value, through operation of handle 52 and cam 178, the exhaust valve 174 will be closed and the inlet valve 176 will be opened as heretofore stated. Fluid pressure from the main reservoir will thereupon flow through the conduit 36 and past the open inlet valve 176 to the outlet chamber 186, and thence through the conduits 34 to the vehicle tires. As soon as the pressure within the outlet chamber 186 builds up beneath the diaphragm 166 through a communicating choke opening 171, to a value such that it overcomes the downward force of the spring 182, the plunger 172 will be moved upwardly and the valves 174 and 176 will also be moved upwardly under the action of a spring 177. Finally, these parts will occupy such a position that both the valves 174 and 176 are closed. This is the lapped position of the feed valve 50 and when in this position, no further pressure will be admitted to the outlet chamber 186. As soon as the tires have been inflated to the desired pressure, the control handle 52 is returned to its zero position whereupon the parts will assume the positions shown in Fig. 7 and the conduits 34 will be exhausted.

On the other hand, should it be desired to reduce the tire pressure, it is only necessary to move the control handle 52 of the feed valve 50 in a counterclockwise direction from the zero position as shown in Fig. 8 in order to move the cam 178 upwardly and open the deflation control valve 54. Thereupon, as fully described above, auxiliary reservoir pressure from the reservoir 58 is conducted to the conduits 34 in order to open the deflation check valves 110 and positively close the inflation check valves 108, see Figs. 3 to 6, inclusive. Reduction of tire pressures is continued until the operator, by virtue of road feel or past experience, knows that the tires are deflated to the desired pressure. As soon as this occurs, the handle 52 is returned to the zero or exhaust position as shown in Fig. 8, and the parts returned to the positions shown in Fig. 7.

In operation, and referring to the system disclosed in Fig. 1, it is only necessary to operate the feed valve 50 to the desired pressure indication in order to inflate the vehicle tires to the desired pressure. For example, the handle 52 is moved in a clockwise direction to the desired point on the dial 184, Fig. 8, in order to open the intake valve 176 and connect the main reservoir 32 to the control conduits 34 by way of the outlet chamber 186 of the feed valve 50. Thereupon, fluid in all of the conduits 34 flows to the inlet chamber 100 of the valve 28, Fig. 4, by way of conduit sections 40 and 42. The inflation check valve 108 controls the flow of air pressure to the tire through the conduit 30 and as soon as the tire has been inflated, the handle 52 is returned to the zero position and the conduits 34 are exhausted by way of outlet chamber 186, the hollow plunger 172, opening 188, exhaust chamber 168, passages 198 and 194 and the atmospheric port 196. The check valve 108 of the control valve 28 thereupon retains the air pressure within the tire. In the case of the modified form of control valve shown in Fig. 6, here again, the check valve 108 prevents any return flow of air pressure from the tire as soon as the feed valve 50 is returned to exhaust position and the chamber 150, the passage 148 and the inlet chamber 140 are exhausted through conduit sections 40 and 42.

If at any time, due to road conditions or loading of the vehicle, it is desired to reduce the tire pressures, it is only necessary to move the handle 52 in a counterclockwise position from the zero position shown in Fig. 8. When this is done, the member 192 is moved downwardly through movement of cam 178 and rocking of the lever 210. This action opens the inlet valve 202 of the deflation control valve 54 and connects the conduits 34 with the conduit 60 in order to conduct auxiliary reservoir pressure to the control valves 28 mounted on the wheels. Since the auxiliary reservoir pressure is in excess of the maximum operating pressure of the tires, the deflation check valve 110 of Fig. 4 will be moved downwardly by operation of the piston 120 in order to connect the tire with the atmospheric port 104 by way of conduit 30, outlet chamber 92 and exhaust chamber 102. Simultaneously with this action, downward movement of the piston 130 serves to maintain the inflation check valve 108 firmly against its seat 112.

In the case of the modified form of control valve shown in Fig. 6, the piston 152 will be moved upwardly in response to auxiliary reservoir pressure present in the inlet chamber 140 to open the deflation check valve 110 and connect the tire with the atmospheric port 146 through conduit 30, outlet chamber 142 and exhaust chamber 144. As the deflation check valve 110 opens, plunger 160 carried thereby will engage and positively close inflation check valve 108.

In the case of either of the control valves above described, the tire pressures may be reduced to the desired value whereupon further reduction will be arrested as soon as the control handle 52 is moved to exhaust position. When this occurs, it will be readily understood that the member 192 is returned to the position illustrated in Fig. 7 through the action of a spring 216 in order to again bring the passage 194 into registry with the atmospheric port 196. If desired, a spring-closed check valve, not shown, may be associated with the exhaust openings 104 and 146 in order to control the minimum pressure to which the tire pressure may be reduced or deflated. With such an arrangement it will be understood that the minimum tire pressures would be determined by the tension of the spring acting on the valve which closes the exhaust ports 104 or 146.

It will therefore be readily appreciated from the foregoing that the present invention provides a novel arrangement for controlling the tire pressures while the vehicle is in operation. The construction is such that a single conduit is connected with each of the tire control valves and variations of air pressure in the single conduit serves not only to control the degree of inflation of the tires but also serves, under certain conditions, to control the lowering of the tire pressures. It will also be noted that the rotary seals 46 and 48 are only subjected to air pressure during the process of inflating and deflating, thus greatly increasing the life of such seals. In addition, only one conduit is required between the tires and the tire control valves. The above desirable features are secured by the novel control valves carried by the wheels and which include pressure responsive means for opening the deflation valves only when the control pressure exceeds the maximum operating pressure of the tire. The combined feed valve and master deflation valve also provides a novel and simplified arrangement and enables ready control of the tire pressures by the mere manipulation of the control handle of the feed valve in one direction or the other.

While several embodiments of the present invention have been shown and described herein with considerable particularity, it will be readily understood by those skilled in the art that the invention is not limited to the form shown but is capable of a variety of expressions. Reference will therefore be had to the appended claims for a definition of the limits of the invention.

What is claimed is:

1. A tire inflation control system for a vehicle wheel having a pneumatic tire mounted thereon, comprising a valve device carried by the wheel and provided with a casing having an outlet chamber in communication at all times with the tire and also having an exhaust chamber in constant communication at all times with the atmosphere, a source of compressed air, a single conduit for conducting compressed air from said source to said outlet chamber, a control valve in said conduit for controlling the pressure of the air conducted to said outlet chamber, said valve device including an inflating check valve for allowing flow of compressed air from the single conduit to the outlet chamber but preventing return flow from the outlet chamber to the single conduit, and also including a deflation check valve for normally preventing flow of compressed air from the outlet chamber to the exhaust chamber, and a fluid pressure responsive means movable in response to a predetermined pressure of the air in said single conduit for positively moving said deflating check valve to open communication between the outlet chamber and the exhaust chamber to lower the pressure in the tire.

2. A tire inflation control system for a vehicle wheel having a pneumatic tire mounted thereon, comprising a valve device carried by the wheel and provided with a casing having an outlet chamber in communication at all times with the tire and also having an exhaust chamber in constant communication at all times with the atmosphere, a source of compressed air, a single conduit for conducting compressed air from said source to said outlet chamber, a control valve in said conduit for controlling the pressure of the air conducted to said outlet chamber, a spring-closed inflating check valve in the outlet chamber for preventing return flow of compressed air from the outlet chamber to said single conduit, a spring-closed deflating check valve in said outlet chamber for normally preventing communication between the outlet chamber and the exhaust chamber, and a fluid pressure responsive means movable in response to a predetermined pressure of the air in said single conduit for positively moving said deflating check valve to open communication between the outlet chamber and the exhaust chamber to lower the pressure in the tire.

3. A tire inflation control system for a vehicle wheel having a pneumatic tire mounted thereon, comprising a valve device carried by the wheel and provided with a casing having an outlet chamber in communication at all times with the tire and also having an exhaust chamber in constant communication at all times with the atmosphere, a source of compresed air, a single conduit for conducting compressed air from said source to said outlet chamber, a control valve in said conduit for controlling the pressure of the air conducted to said outlet chamber, said valve device including an inflating check valve for allowing flow of compressed air from the single conduit to the outlet chamber but preventing return flow from the outlet chamber to the single conduit, and also including a deflating check valve for normally preventing flow of compressed air from the outlet chamber to the exhaust chamber, and a fluid pressure responsive means movable in response to a predetermined pressure of the air in said single conduit for positively moving said deflating check valve to open communication between the outlet chamber and the exhaust chamber to lower the pressure in the tire, and for positively holding the inflating check valve closed so as to prevent communication between said first conduit and said outlet chamber.

4. A tire inflation control system for a vehicle wheel having a pneumatic tire mounted thereon, comprising a valve device carried by the wheel and provided with a casing having an outlet chamber in communication at all times with the tire and also having an exhaust chamber in constant communication at all times with the atmosphere, a source of compressed air, a single conduit for conducting compressed air from said source to said outlet chamber, a control valve in said conduit for controlling the pressure of the air conducted to said outlet chamber, a spring-closed inflating check valve in the outlet chamber for preventing return flow of compressed air from the outlet chamber to said single conduit, a spring-closed deflating check valve in said outlet chamber for normally preventing communication between the outlet chamber and the exhaust chamber, and a fluid pressure responsive means movable in response to a predetermined pressure of the air in said single conduit for positively moving said deflating check valve to open communication between the outlet chamber and the exhaust chamber to lower the pressure in the tire, and for positively holding the inflating check valve closed so as to prevent communication between said first conduit and said outlet chamber.

5. A tire inflation control system for a vehicle wheel having a pneumatic tire mounted thereon, comprising a valve device carried by the wheel and provided with a casing having an outlet chamber in communication at all times with the tire and also having an exhaust chamber in constant communication at all times with the atmosphere, a source of compressed air, a single conduit for conducting compressed air from said source to said outlet chamber, a control valve in said conduit for controlling the pressure of the air conducted to said outlet chamber, said valve device including an inflating check valve for allowing flow of compressed air from the single conduit to the outlet chamber but preventing return flow from the outlet chamber to the single conduit, and also including a deflating check valve for normally preventing flow of compressed air from the outlet chamber to the exhaust chamber, a fluid pressure responsive means in said casing movable in response to a predetermined pressure of the air in said single conduit, and a plunger carried by said pressure responsive means to engage and move the deflating check valve to open communication between the outlet chamber and the exhaust chamber to lower the pressure in the tire when the pressure in said conduit reaches said predetermined pressure.

6. A tire inflation control system for a vehicle wheel having a pneumatic tire mounted thereon, comprising a valve device carried by the wheel and provided with a casing having an outlet chamber in communication at all times with the tire and also having an exhaust chamber in constant communication at all times with the atmosphere, a source of compressed air, a single conduit for conducting compressed air from said source to said outlet chamber, a control valve in said conduit for controlling the pressure of the air conducted to said outlet chamber, a spring-closed inflating check valve in the outlet chamber for preventing return flow of compressed air from the outlet chamber to said single conduit, a spring-closed deflating check valve in said outlet chamber for normally preventing communication between the outlet chamber and the exhaust chamber, and a fluid pressure responsive means in said casing movable in response to a predetermined pressure of the air in said single conduit, and a plunger carried by said pressure responsive means to engage and move the deflating check valve to open communication between the outlet chamber and the exhaust chamber to lower the pressure in the tire when the pressure in said conduit reaches said predetermined pressure.

7. A tire inflation control system for a vehicle wheel having a pneumatic tire mounted thereon, comprising a valve device provided with a casing having an outlet chamber in constant communication with the tire and also having an exhaust chamber in constant communication with the atmosphere, a source of compressed air, a single conduit for conducting compressed air from said source to said outlet chamber, a control valve in said conduit for controlling the pressure of the air conducted to said outlet chamber, a spring-closed inflating check valve in the outlet chamber for preventing return flow of compressed air from the outlet chamber to said single conduit, a spring-closed deflating check valve in said outlet chamber for normally preventing communication between the outlet chamber and the exhaust chamber, a fluid pressure responsive means in said casing movable in response to a predetermined pressure of the air in said single conduit for positively moving said deflating check valve to open communication between the outlet chamber and the exhaust chamber to lower the pressure in the tire, and a separate fluid pressure responsive means in said casing movable to positively hold the inflating check valve closed to prevent communication between said first conduit and said outlet chamber when the pressure of the air in said single conduit reaches said predetermined pressure.

8. A tire inflation control system for a vehicle wheel having a pneumatic tire mounted thereon, comprising a control valve carried by the wheel and provided with a casing having an outlet chamber in constant communication with the tire and having also an exhaust chamber in constant communication with the atmosphere, a source of compressed air, a single conduit for delivering compressed air from said source to said outlet chamber, a control valve in said conduit for controlling the pressure of the air delivered to said outlet chamber, a pair of separate check valves in said outlet chamber, one of said check valves preventing return flow of compressed air from the outlet chamber to said conduit, and the other check valve normally preventing communication between the outlet and exhaust chambers, a spring interposed between said check valves to yieldably maintain the latter in closed position, fluid pressure responsive means in said casing movable in response to a predetermined pressure of the air in said single conduit for opening said other check valve to connect the outlet chamber with the exhaust chamber to reduce the pressure in the tire, and means for positively holding said one check valve closed when said other check valve is opened.

9. A tire inflation control system as set forth in claim 8 wherein the last named means comprises a plunger carried by said other check valve to engage said one check valve.

10. A tire inflation control system for a vehicle wheel having a pneumatic tire mounted thereon, comprising a source of compressed air, a valve device carried by the wheel, a single conduit connecting said valve device with said source and including a control valve therein for varying the pressure of the air supplied to said valve device, the valve device including a first check valve for connecting the conduit with the tire while preventing return flow of air from the tire to the conduit, and also including a second check valve movable to connect the tire with the atmosphere to lower the pressure in the tire, and means movable when the air pressure in said conduit exceeds a preselected value for moving said second check valve to connect the tire with the atmosphere.

11. A tire inflation control system for a vehicle wheel having a pneumatic tire mounted thereon, comprising a source of compressed air, a valve device carried by the wheel, a single conduit connecting said valve device with said source and including a control valve therein for varying the pressure of the air supplied to said valve device, the valve device including a first check valve for connecting the conduit with the tire while preventing return flow of air from the tire to the conduit, and also including a second check valve movable to connect the tire with the atmosphere to lower the pressure in the tire, and fluid pressure responsive means movable when the air pressure in said conduit exceeds a preselected value for moving said second check valve to connect the tire with the atmosphere and for also preventing passage of compressed air from said conduit to the tire.

12. A tire inflation control system for a vehicle wheel having a pneumatic tire mounted thereon, comprising a source of compressed air, a valve device carried by the wheel, a single conduit connecting said valve device with said source and including a control valve therein for varying the pressure of the air supplied to said valve device, the valve device including a first check valve for connecting the conduit with the tire while preventing return flow of air from the tire to the conduit, and also including a second check valve movable to connect the tire with the atmosphere to lower the pressure in the tire, a member movable to move said second check valve to connect the tire with the atmosphere, another member movable to prevent passage of compressed air from said conduit to the tire, and separate fluid pressure responsive means movable when the air pressure in said conduit exceeds a preselected value for moving both of said members.

13. A tire inflation control system for a vehicle wheel having a pneumatic tire mounted thereon, comprising a source of compressed air, a valve device carried by the wheel, a single conduit connecting said valve device with said source and including a control valve therein for varying the pressure of the air supplied to said valve device, the valve device including a first check valve for connecting the conduit with the tire while preventing return flow of air from the tire to the conduit, and also including a second check valve movable to connect the tire with the atmosphere to lower the pressure in the tire, and fluid pressure responsive means movable when the air pressure in said conduit exceeds a preselected value for moving said second check valve to connect the tire with the atmosphere and for maintaining the first check valve in a closed position to prevent passage of compressed air from said conduit to the tire.

14. A tire inflation control system for a vehicle wheel having a pneumatic tire mounted thereon, comprising a source of compressed air, a valve device carried by the wheel, a single conduit connecting said valve device with said source and including a control valve therein for varying the pressure of the air supplied to said valve device, the valve device including a first check valve for connecting the conduit with the tire while preventing return flow of air from the tire to the conduit, and also including a second check valve movable to connect the tire with the atmosphere to lower the pressure in the tire, a member movable to move said second check valve to connect the tire with the atmosphere, another member movable to maintain the first check valve in a closed position to prevent passage of compressed air from said conduit to the tire, and separate fluid pressure responsive means movable when the air pressure in said conduit exceeds a preselected value for moving both of said members.

15. A tire inflation control system for a vehicle wheel having a pneumatic tire mounted thereon, comprising a source of compressed air, a valve device carried by the wheel, a single conduit connecting said valve device with the tire, another single conduit connecting said valve device with said source, said valve device including valve means for retaining air pressure in the tire when the pressure in said other conduit is at or below a preselected value and for connecting the tire to atmosphere to reduce the pressure therein when the pressure in said other conduit is above said preselected value, and a control valve in said other conduit including a member movable in one direction from a neutral position to graduate the flow of compressed air to said other conduit and movable in another direction from neutral to deliver compressed air to said other conduit at a pressure above said preselected value.

16. A tire inflation control system for a vehicle wheel having a pneumatic tire mounted thereon, comprising a reservoir of compressed air, a valve device carried by the wheel, a single conduit connecting said valve device with said source, said valve device including a pair of movable valves for controlling the inflation pressures of the tire, one of said valves being movable to reduce the pressure in the tire when the pressure in said conduit exceeds a predetermined value, and a manually operable control valve in said conduit for delivering compressed air from the source to the valve device comprising a first valve for graduating the pressure delivered to said conduit, a second valve for delivering full reservoir pressure to said conduit, and a control member movable in one direction to control the first valve, and movable in another direction to control the second valve.

17. A tire inflation control system as set forth in claim 16 which includes in addition, an auxiliary reservoir; a conduit connecting said reservoirs, a one-way check valve in the last named conduit allowing flow to the auxiliary reservoir only, and means connecting the auxiliary reservoir with said second valve.

THOMAS J. TUREK.
R. VAN DYKE FIRTH, Sr.

References Cited in the file of this patent

UNITED STATES PATENTS

| Number | Name | Date |
| --- | --- | --- |
| 2,156,841 | Davis | May 2, 1939 |
| 2,213,539 | Wiegand | Sept. 3, 1940 |
| 2,418,730 | Schule | Apr. 8, 1947 |
| 2,452,527 | Peter | Oct. 26, 1948 |